United States Patent [19]
Schellinger et al.

[11] Patent Number: 5,809,419
[45] Date of Patent: Sep. 15, 1998

[54] METHOD FOR REDUCING CHANNEL SCANNING TIME

[75] Inventors: Michael John Schellinger, Vernon Hills; Daniel Charles Poppert, Wildwood, both of Ill.

[73] Assignee: Motorola, Inc., Schaumburg, Ill.

[21] Appl. No.: 356,602

[22] Filed: Dec. 14, 1994

[51] Int. Cl.[6] .................................................. H04B 7/00
[52] U.S. Cl. ...................... 455/434; 455/515; 455/166.1
[58] Field of Search ............................ 455/161.1, 161.2, 455/161.3, 166.1, 166.2, 179.1, 185.1, 33.1, 89, 34.1, 34.2, 432, 434, 450, 454, 515

[56] References Cited

U.S. PATENT DOCUMENTS

| | | | |
|---|---|---|---|
| 4,750,198 | 6/1988 | Harper | 455/33.1 |
| 4,799,253 | 1/1989 | Stern et al. | 379/59 |
| 4,893,327 | 1/1990 | Stern et al. | 379/59 |
| 4,905,301 | 2/1990 | Krolopp et al. | 455/33.4 |
| 5,095,530 | 3/1992 | Tanaka et al. | 455/434 |
| 5,119,502 | 6/1992 | Kallin et al. | 455/161.3 |
| 5,212,803 | 5/1993 | Uddenfeldt et al. | 455/33.1 |
| 5,442,680 | 8/1995 | Schellinger et al. | 379/58 |
| 5,457,816 | 10/1995 | Koyama | 455/161.3 |
| 5,517,673 | 5/1996 | Fehnel | 455/515 |
| 5,524,278 | 6/1996 | Williams et al. | 455/34.1 |
| 5,566,358 | 10/1996 | Obayashi et al. | 455/434 |
| 5,574,976 | 11/1996 | Schellinger | 455/54.1 |

*Primary Examiner*—Edward F. Urban
*Attorney, Agent, or Firm*—John J. King

[57] ABSTRACT

A unique method improves channel scanning by reducing the time required to scan channels. The method reduces the number of channels which must be scanned using information previously obtained in a scan. If two sets of channels which overlap are scanned in two separate scanning steps (522), information obtained in a first channel scan can be used, thereby eliminating the time required for a second channel scan. For example, if the dedicated control channels and the paging channels of a cellular telephone system overlap, the channels which overlap need not be scanned during the channel scan of the paging channels. The method further reduces scanning time by ending the channel scanning of a particular channel if an undesired channel type is detected (808).

20 Claims, 7 Drawing Sheets

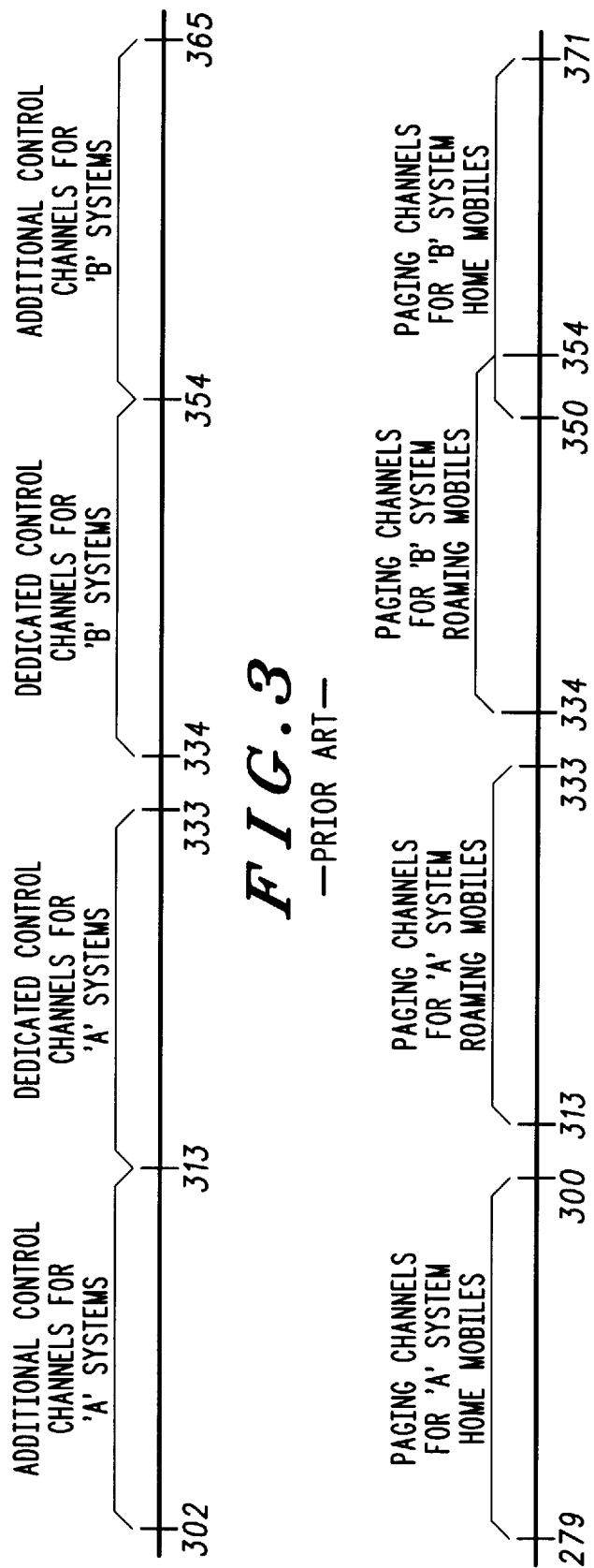

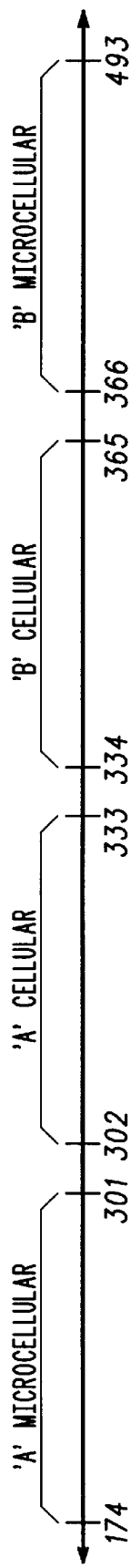
FIG. 6 —PRIOR ART—
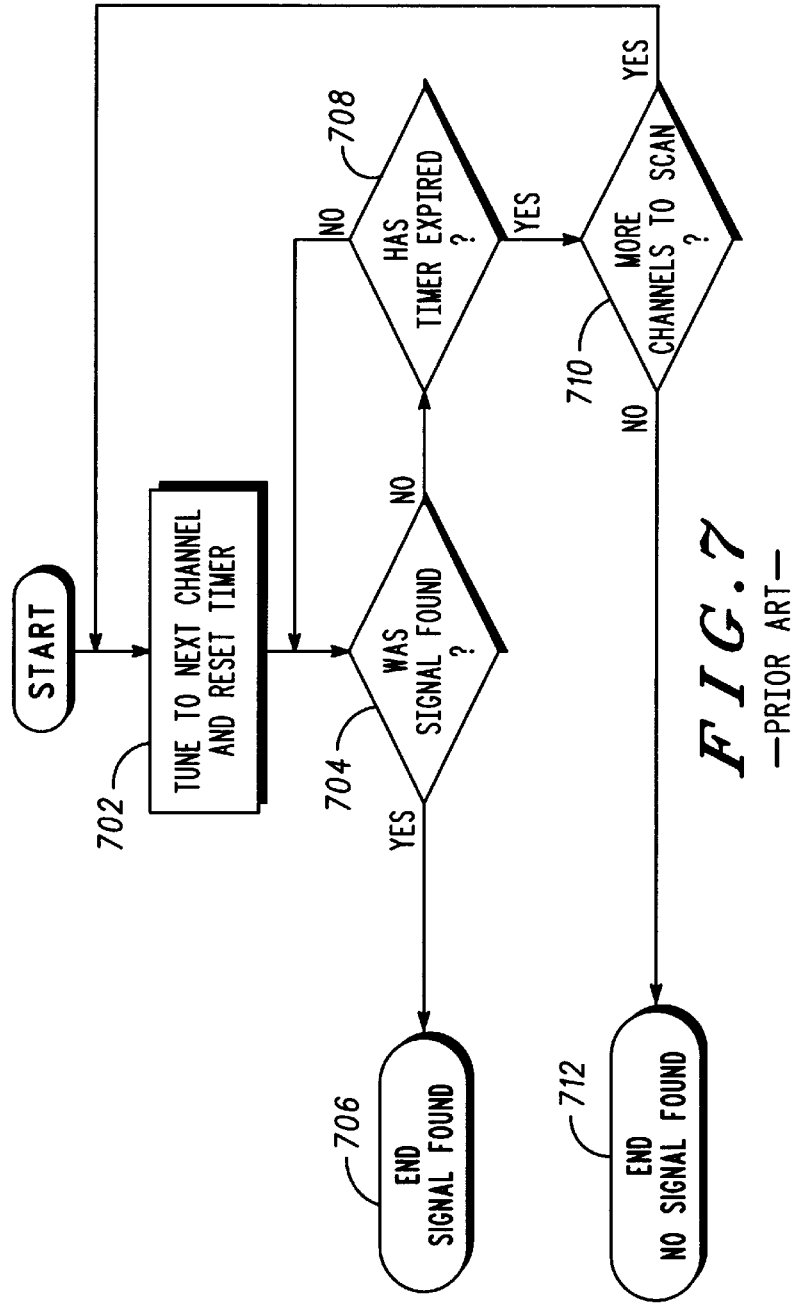
FIG. 7 —PRIOR ART—

METHOD FOR REDUCING CHANNEL SCANNING TIME

FIELD OF THE INVENTION

The present invention is generally related to wireless communication systems, and more particularly to scanning channels of wireless communication systems.

BACKGROUND OF THE INVENTION

In a wireless communication system, such as a cellular telephone system, a radiotelephone must scan channels prior to making a connection to the cellular system or receiving a page from the cellular system. Domestic analog cellular systems as described in EIA/TIA-553, such EIA/TIA standard being published by Electronics Industry Association, 2001 Pennsylvania Ave., N.W., Washington , D.C. 20006, and its derivatives utilize both control channels and voice channels.

Control channels provide a means for the system to identify itself, to transmit pages (messages used to indicate an inbound call to subscriber equipment), to transmit short text messages, etc. Control channels also provide a means for the cellular telephone subscriber equipment (commonly called mobile stations) to identify themselves to the system (commonly called registration), to originate telephone calls, to respond to pages, etc. Voice channels provide a means for voice communication.

Domestic analog cellular systems provide for both a dedicated set of control channels and optionally for additional paging and access channels. While cellular service providers typically allocate 21 channels as dedicated control channels, service providers can increase the number of control channels from 21 to 32. Further, there are two other ways in which a service provider can configure the control channels to provide more control channel capacity. The first method involves using one range of channels for pages and another range of channels for access functions. The second method involves using one range of channels for paging of home mobiles and another range of channels for paging of roaming mobiles.

In order for the mobile station to determine the control channel which it should use for receiving pages, it must perform two scanning processes. The first process is commonly called the initialization channel scan while the second process is commonly called the paging channel scan. While performing these scans it is not possible for the mobile station to receive pages or other outbound messages since the mobile station is changing channels frequently. This may result in the subscriber missing calls or other important messages such as text messages.

This problem is even more significant in TDMA cellular systems as described in EIA/TIA IS-54B. TDMA cellular systems use two ranges of paging channels for A mobiles and two ranges of paging channels for B mobiles. A TDMA mobile may need to perform up to three scans including an initialization channel scan on the dedicated control channels, a paging channel scan on the TDMA paging channels, and a paging channel scan on the analog paging channels. A similar problem also exists for CDMA mobile stations as described by EIA/TIA IS-95.

The problem is aggravated in analog, TDMA, and CDMA systems by the need to search for PCS systems such as the Cellular Auxiliary Personal Communication Service described in EIA/TIA IS-94 for 800 MHz cellular spectrum, cordless systems which are being developed for 800 MHz cellular spectrum, and services to be developed in the recently allocated spectrum from 1.8 to 2.2 GHz. The large amount of scanning results in slow operation by the mobile station, which will aggravate the user. Unnecessarily scanning each channel in both an initial channel scan and a paging channel scan can lead to increased scanning time.

Another problem associated with scanning channels occurs when a channel continues to be scanned after it is determined to be an undesired channel. A new cellular radiotelephone specification for digital control channel operation which includes a TDMA voice channel is currently under development. This specification is EIA/TIA PN3011 and comes as a two volume set: PN3011-1 and PN3011-2. It provides a means to determine the difference between a Digital Control Channel (DCCH) and a Digital Traffic Channel (DTC) when scanning for a DCCH, as described in Sections 6.3.12 and 4.4.8 of PN3011-1. The DCCH is used for control signaling such as paging the mobile station, while the DTC is used for digital voice transmission. If the mobile station finds a DTC, it may interrogate the Coded Digital Channel Locator (CDL) field.

This field is described in Section 1.2.6 of PN3011-2. This field, which describes a range of channels which potentially include a digital control channel, may be used to assist in determining the location of a DCCH. However, the technique employed in TDMA is only useful when the desired and undesired signals use the same type of modulation scheme. That is, the TDMA technique would not allow detection of an undesired analog signal when the desired signal is a digital signal.

Accordingly, there is a need for a method to reduce the scanning time in a wireless communication system. In particular, there is a need to utilize information obtained during a first scanning step to minimize or eliminate a second scanning step. There is a further need to use information while scanning a particular channel to determine whether to continue to scan channels.

BRIEF DESCRIPTION OF THE DRAWINGS

FIG. 3 is a diagram showing the control channel allocation for a wireless communication system;

FIG. 4 is a diagram showing the paging channel allocation for a wireless communication system;

FIG. 6 is a flow chart showing the channel allocation for cellular and microcellular systems operating within range of one another;

FIG. 7 is a flow chart of a conventional scanning technique; and

DETAILED DESCRIPTION OF A PREFERRED EMBODIMENT

The method of the present invention generally improves channel scanning by reducing the time required to scan channels. According to one novel aspect of the invention, the number of channels which must be scanned can be reduced by using information previously obtained in a scan. For example, a mobile can use information obtained in a first channel scan to eliminate the time required for a second channel scan. For example, if the dedicated control channels and the paging channels of a cellular telephone system overlap, the channels which overlap need not be scanned during the channel scan of the paging channels. That is, information that would otherwise be obtained during the channel scan of the paging channels can be obtained during a channel scan of the dedicated control channels.

Figure 1:
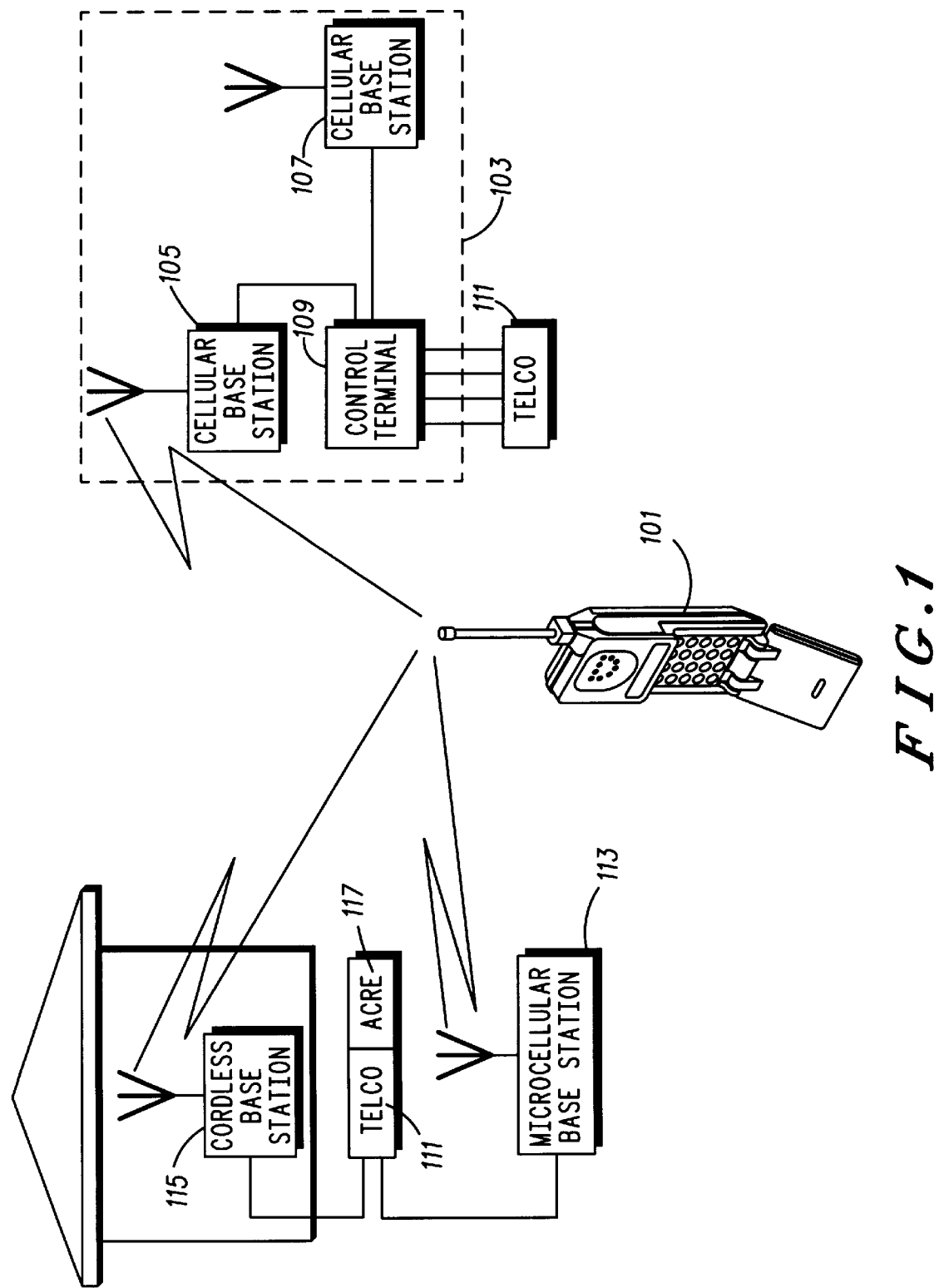
FIG. 1 is a block diagram of a wireless communication system having a wireless communication device adapted to communication with a plurality of systems.

Turning first to FIG. 1, a generalized block diagram of a wireless communication network having a wireless communication device, such as a mobile or portable handset, adapted to communicate with multiple networks is shown. A handset 101 is shown having the ability to communicate with a conventional cellular radiotelephone system 103, which has a plurality of cellular base stations 105, 107 located at geographically separate locations which are selected to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

Handset 101 could further have the capacity to communicate with a microcellular base station 113, which is a cellular adjunct cell having lower power and limited capabilities but providing public radiotelephone service to distinct areas such as shopping malls and airports. The microcellular base station 113 is coupled to the TELCO 111 landline telephone system so that calls can be placed to the TELCO.

Finally, the handset may have the capability to communicate with a cordless base station 115, which provides private telephone line interconnection to the TELCO 111 for the user of handset 101. Preferably, the cordless communication system uses an authorization and call routing equipment (ACRE) 117 to provide call routing information to a telephone switching system. Thus, the switching system automatically routes phone calls between the cellular, microcellular and cordless systems. The ACRE 117 also authorizes the cordless base station 115 to utilize channels. The ACRE 117 can be part of the TELCO 111 or can be a stand alone device. While the block diagram of FIG. 1 shows a wireless communication system having a handset adapted to communication with a plurality of communication networks, this communication system is shown as an exemplary system which could employ the present invention. The novel aspects of the present invention could apply to any wireless communication system which requires scanning channels, including but not limited to cordless, cellular, personal communication services (PCS), or other future wireless systems.

Figure 2:
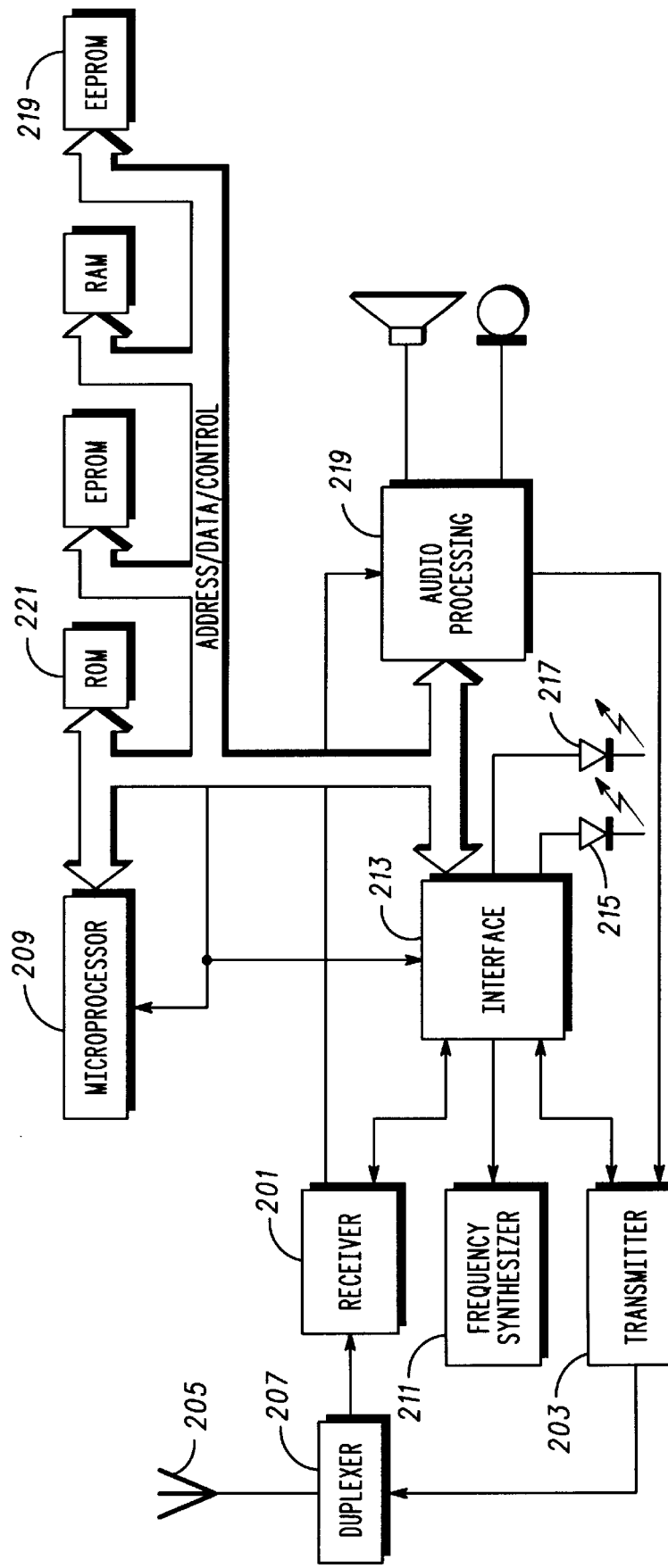
FIG. 2 is a block diagram of a conventional wireless communication device which could incorporate the present invention.

Turning now to FIG. 2, handset 101 is a portable radiotelephone transceiver which is shown in block diagram form. A portable radio receiver 201 and a portable transmitter 203 are coupled to the antenna 205 of handset 101 by way of a duplexer 207. The particular radio frequency to be used by the transmitter 203 and the receiver 201 is determined by the microprocessor 209 and conveyed to the frequency synthesizer 211 via the interface circuit 213. Data signals received by the receiver 201 are decoded and coupled to the microprocessor 209 by the interface circuit 213 and data signals to be transmitted by the transmitter 203 are generated by the microprocessor 209 and formatted by the interface 213 before being transmitted by the transmitter 203. Operational status of the transmitter 203 and the receiver 201 is enabled or disabled by the interface 213. The interface also controls light emitting diodes, 215 and 217, which are used to indicate to the user which system handset 101 is currently receiving. Control of user audio, the microphone output and the speaker input, is controlled by audio processing circuitry 219.

In the preferred embodiment, the microprocessor 209 is a 68HC11 microprocessor, available from Motorola, Inc., and performs the necessary processing functions under control of programs stored in conventional ROM 221. Characterizing features of handset 101 are stored in EEPROM 219 (which may also be stored in the microprocessor, on-board EEPROM) and include the number assignment (NAM) required for operation in a conventional cellular system and the base identification (BID) required for operation with the user's own cordless base.

The transmitter 203 of handset 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when handset 101 is in the cellular system mode.

Turning now to FIGS. 3 and 4, the designated control channels and paging channels for a conventional wireless system, such as a cellular radio telephone system, are shown. In conventional cellular systems in the United States, for example, cellular coverage is provided by two different service providers in each region. FIG. 3 shows the dedicated control channels for an A system including channels 313 through 333 and the dedicated control channels for a B system including channels 334 through 354. Although 21 channels in A systems and 21 channels in B systems are dedicated for nationwide use as control channels, each system provider could chose to use a different number of channels. A system operator could also designate additional control channels ranging, for example, from channel 302 through 313 for the A system or from 354 through 365 for the B system.

FIG. 4 shows a configuration of the paging channels designated for both the A system and the B system for "home" mobile and "roaming" mobiles. A home mobile is a mobile which is within the boundary of a system in which a user subscribes for cellular service, while a roaming mobile is a mobile which is outside of the region in which a user subscribes for cellular service. In particular, the paging channels for the A system home mobile are shown to include channels 279 through 300. The paging channels for the A system roaming mobiles are shown to include channels 313 through 333. The paging channels for the B system roaming mobiles includes channels 334 through 354, while the paging channels for the B system home mobiles include channels 350 through 371. While the paging channels for the B system roaming mobiles and home mobiles partially are shown to overlap, it will be understood that the paging channels for the B system could be mutually exclusive, could completely overlap, or could be identical. The paging channels for the 'A' system roaming mobiles, 313 to 333, also act as dedicated control channels for 'A' system home and roaming mobiles. The paging channels for the 'B' system roaming mobiles, 334 to 354, also act as dedicated control channels for 'B' system home and roaming mobiles. While the paging channels for 'B' system home mobiles are shown to overlap with 'B' system dedicated control channels, it will be understood that these ranges of channels could be mutually exclusive, could completely overlap, or could be identical.

Figure 5A:
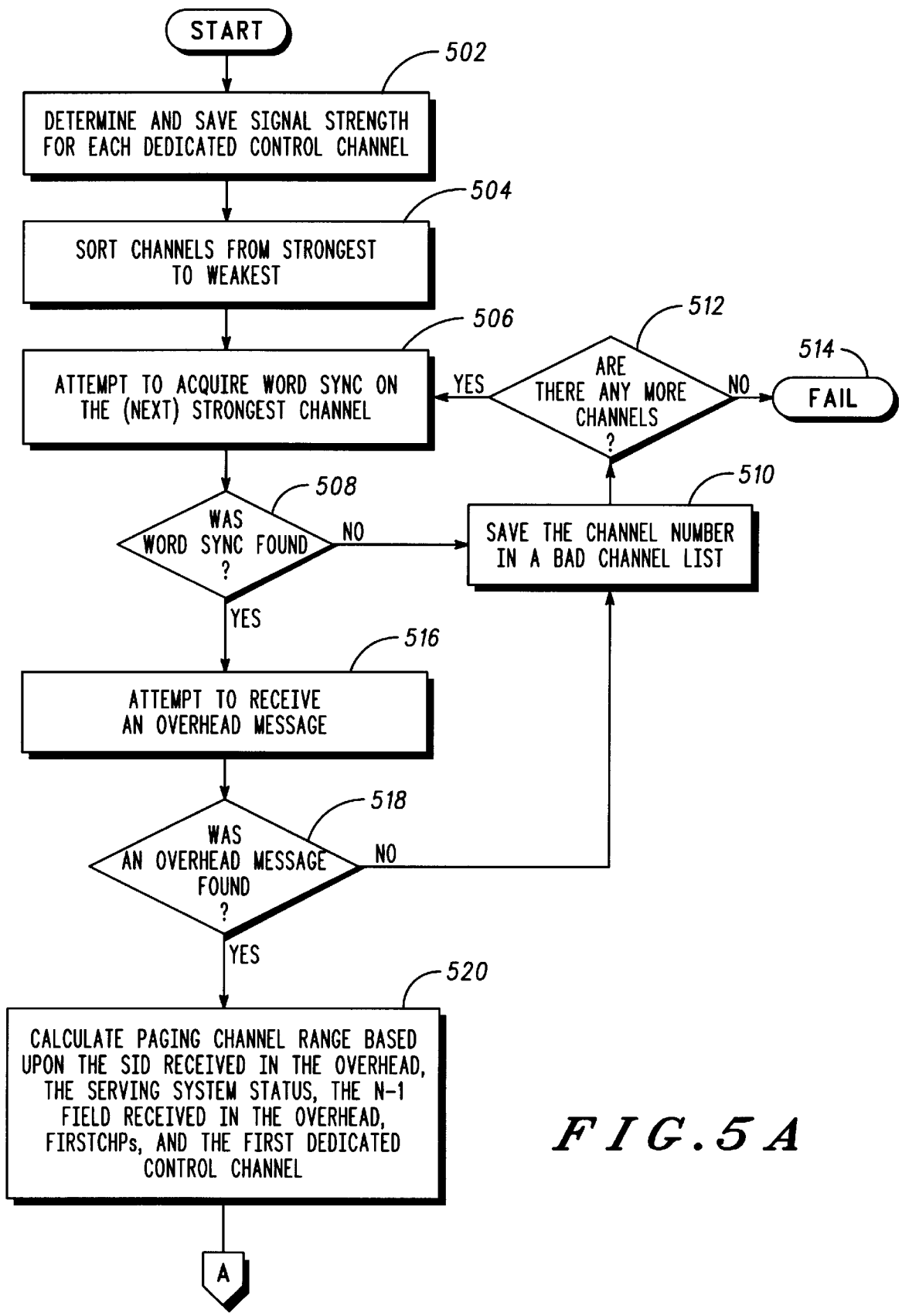
FIGS. 5A and 5B are flow chart showing the preferred method for a first embodiment for channel scanning according to the present.
Figure 5B:
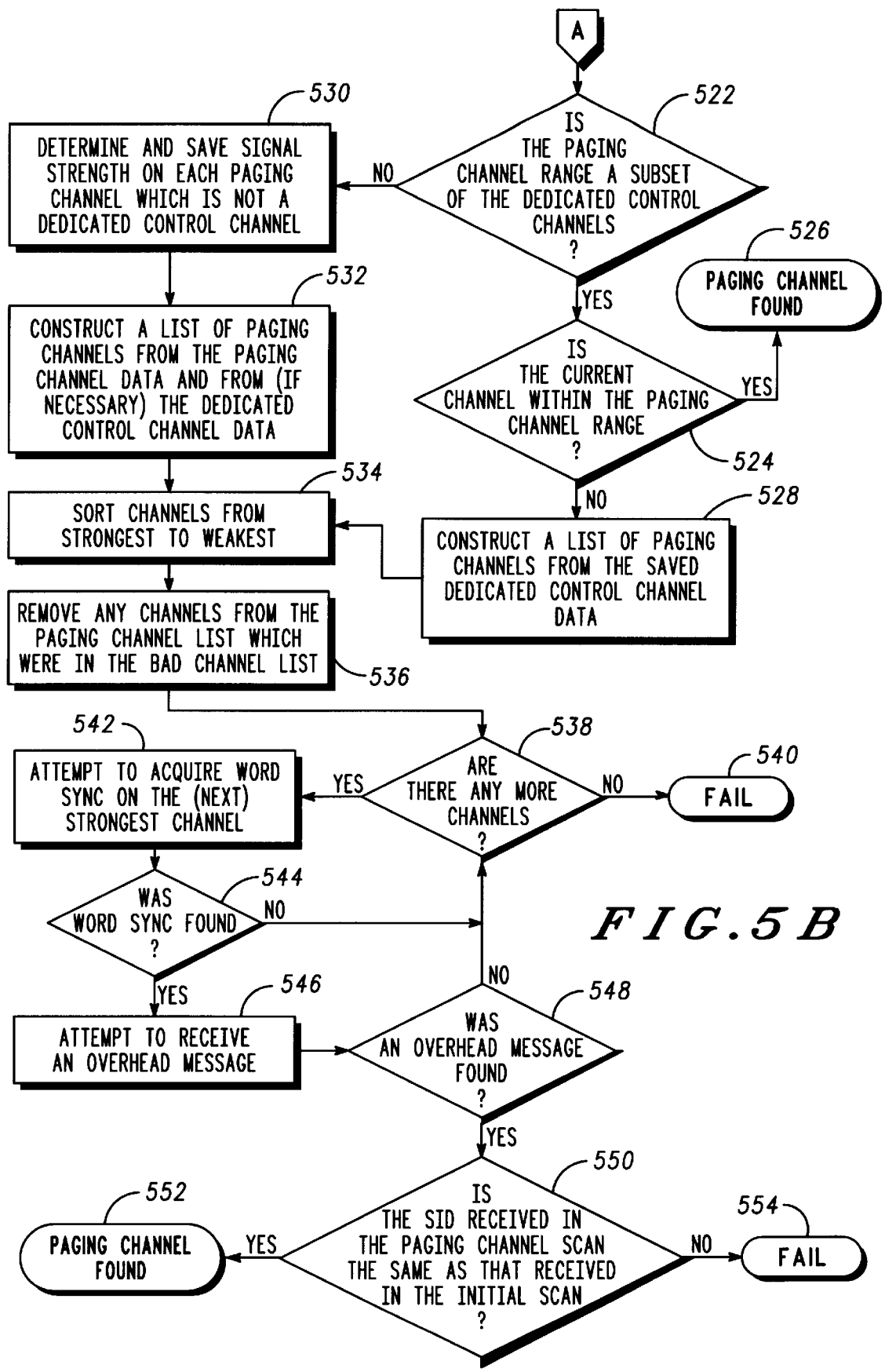

Turning now to FIG. 5a and 5b a method for improving system channel scanning according to the first embodiment of the present invention is shown. At a step 502, the mobile scans each dedicated control channel to determine and save the signal strength for each dedicated control channel. At a step 504, the mobile sorts the channels from the strongest to the weakest. At a step 506, the mobile attempts to acquire a word synchronization (hereinafter "word sync") on the strongest channel. If a word sync was not found at 508, the mobile saves the channel number in a list of bad channels at a step 510 thus indicating that data could not be received on the channel. The mobile then determines if there are any more channels to attempt to acquire a word sync at a step 512. If there are no more channels, the system fails at a step 514. However, if there are more channels, the mobile attempts to acquire a word sync on the next strongest channel at a step 506.

If the word sync is found at step 508, the mobile attempts to receive an overhead message at step 516. If no overhead message is found at a step 518, the mobile saves the channel in the bad channel list at step 510 thus indicating that data could not be received on the channel. However, if an overhead message is found at step 518, the mobile calculates the paging channel range based upon the system identification (SID) received in the overhead, the serving system status, the N-1 field received in the overhead, FIRSTCHPs, and the first dedicated control channel at a step 520. The range of paging channels is defined as the range of channels from FIRSTCHP$_s$ to LASTCHP$_s$ which are calculated according to the following algorithm as set forth in Section 2.6.1.1 of EIA/TIA-553:

Number of paging channels ($N_s$). Set $N_s$ to 1 plus the value of the N-1 field.

First paging channel (FIRSTCHP$_s$). Set FIRSTCHP$_s$ according to the following algorithm:
If $SID_s = SID_p$, FIRSTCHP$_s$ = FIRSTCHP$_p$.
If $SID_s \neq SID_p$ and the serving-system status is enabled, set FIRSTCHP$_s$ to the first dedicated control channel for System A (834.990 MHz mobile transmit, 879.990 MHz land transmit).
If $SID_s \neq SID_p$ and the serving-system status is disabled, set FIRSTCHP$_s$ to the first dedicated control channel for System B (835.020 MHz mobile transmit, 880.020 MHz land transmit).

Last paging channel (LASTCHP$_s$). Set LASTCHP$_s$ according to the following algorithm:
If the serving-system status is enabled, LASTCHP$_s$ = FIRSTCHP$_s$ - $N_s$ + 1
If the serving-system status is disabled, LASTCHP$_s$ = FIRSTCHP$_s$ + $N_s$ - 1

The mobile then determines at a step 522 if the paging channel range is a subset of the dedicated control channels. If the paging channel range is a subset of the dedicated control channels, the mobile determines if the current channel is within the paging channel range at a step 524. If the current channel is within the paging channel range, the paging channel is found at a step 526. At this point, the mobile is ready to receive calls (pages), make calls (origination), or perform other system communications. This saves scanning time, word sync detection time, and overhead reception time which would be required during a paging channel scan. If the current channel is not within the paging channel range, the mobile constructs a list of paging channels from the saved dedicated control channel data at a step 528. This saves the scanning time which would normally be required during paging channel scan.

If the paging channel range is not a subset of the dedicated control channels at a step 522, the mobile determines and saves the signal strength on each paging channel which is not a dedicated control channel at a step 530. The mobile also constructs a list of paging channels at step 532 from the paging channel data saved at step 530 and from the dedicated control channel data saved at step 502 (if necessary). If there is any overlap between the dedicated control channel range and the paging channel range, the overlapping of the channels will not be rescanned, thus reducing the required scanning time. After constructing a list of paging channels at step 528 or step 532, the mobile sorts the channels from the strongest to weakest at a step 534. At a step 536, the mobile removes any channels from the paging channel list which were in the bad channel list.

After removing channels, the mobile determines whether there are any more channels at a step 538. If there are no more channels to be scanned, the channel selection fails at a step 540. However, if there are more channels, the mobile attempts to acquire a word sync on the strongest channel at a step 542. If no word sync is found, the mobile determines whether there are any more channels at step 538. However, if the word sync is found, the mobile attempts to receive an overhead message at a step 546. The mobile then determines whether an overhead message was found at a step 548. If no overhead message was found, the mobile determines whether there are any more channels at step 538. However, if an overhead message is found, the mobile determines whether the SID received in the paging channel scan is the same as the SID received during initial scan at a step 550. If the SID's are the same, the paging channel is found at a step 552. However, if the SID's are not the same, the channel selection fails at a step 554.

While the above description of the first embodiment refers to specific channels for channel scanning, the novel features of the present invention could find application in a variety of systems having different designations for channels. One skilled in the art could employ the present invention in a variety of wireless communication systems within the true spirit and scope of the present invention.

According to another novel aspect of the present invention, the scanning time for obtaining a channel in a wireless communication system can be reduced by bypassing scanning a channel when a predetermined signal is detected indicating that the channel is not a particular type of channel which should be scanned. The time required for scanning channels can become particularly long when a mobile must scan more that one system. As shown for example in FIG. 6, a channel allocation for a combined cellular and microcellular system includes dedicated control channels for the A cellular system extending from channel 302 through channel 333 and dedicated control channels for the B cellular system extending from channel 334 through channel 365. The A system microcellular channels include channels 174 through 301, while B system microcellular channels include channels 366 though 493.

Turning now to FIG. 7, a conventional method for scanning channels is shown. At a step 702, the mobile tunes to the next channel and resets a timer. If a signal is found at a step 704, the method is ended at a step 706. However, if no signal is found, the mobile determines whether a timer has expired at step 708. If the timer has not expired, the mobile continues to search for a signal. However, if the timer has expired, the mobile determines whether there are more channels to scan at a step 710. If there are more channels to scan, the mobile tunes to the next channel and resets the timer at step 702. However, if there are no more channels to scan the method is ended at step 712.

Figure 8:
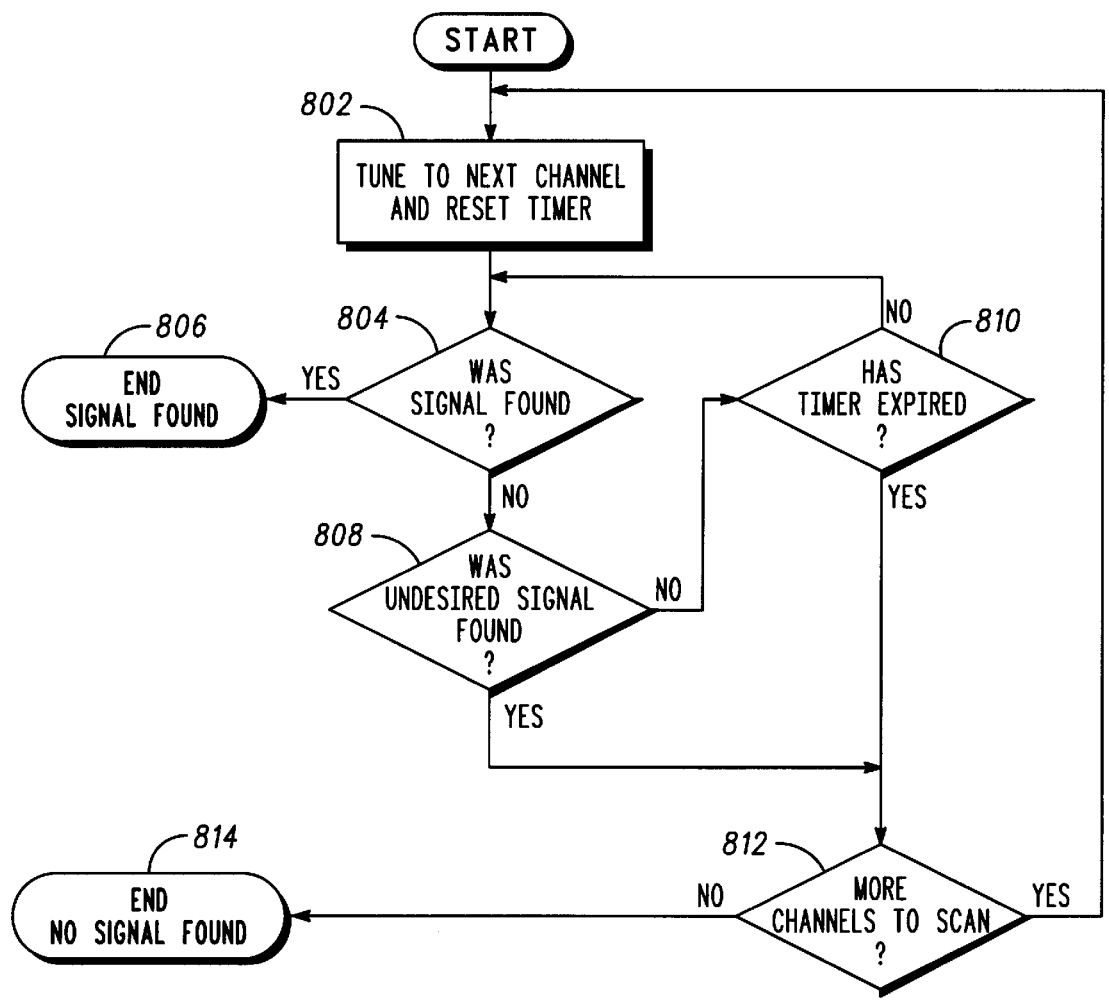
FIG. 8 is a flow chart of a method for channel scanning according to a second embodiment of the present invention.

Turning now to FIG. 8, an improved method for channel scanning according to a second embodiment of the present invention is shown. At a step 802, the mobile tunes to the next channel and resets the timer. At a step 804, the mobile determines whether a signal of one modulation technique was found. If a signal was found, the method is ended at a step 806. However, if no signal is found, the mobile determines whether an undesired signal transmitted by a different modulation technique is found at a step 808. If no undesired signal is found, the mobile determines whether a timer has expired at a step 810. The mobile then continues to scan for a signal until the timer has expired. However, if an undesired signal is found at step 808, the mobile then determines whether there are more channels to scan at a step 812. If there are more channels to scan, the mobile tunes to the next channel and resets the timer at a step 802. However, if there are no more channels to scan, the method is ended at step 814.

One particular application of the method of the second embodiment shown in FIG. 8 can be found in cellular radio telephone system when trying to find a control channel. In a convention cellular system, signals transmitted on an analog voice channel include a supervisory audio tone (SAT). SAT is one of three frequencies: 5970, 6000, or 6030. If a SAT signal is detected, the channel is a voice channel and not a control channel. Therefore, it is not necessary to continue scanning the channel for a signal. By immediately moving on to the next channel when the SAT tone is detected, channel scanning time can be significantly reduced. Such a reduction in scanning time can be particularly significant in a network having multiple systems such as cellular and microcellular.

In summary, the embodiments of the present invention reduce scanning time by evaluating channels. According to novel features of the first embodiment, channels which had previously been scanned during a first scanning step are not unnecessarily scanned a second time during a second scanning step. According to a second embodiment, a mobile station distinguishes between signals transmitted by two different modulation techniques. For example, the mobile station detects a signal transmitted using 10 kilobit per second binary frequency shift keying (a digital transmission technique) and also demodulates an analog FM signal and looks for one or more constant tones (SAT) at the output of the demodulator. Accordingly, detection of two modulation techniques can be simultaneously performed. While the specific implementations of the present invention are described above, variations and modifications could be made by one skilled in the art within the spirit and scope of the present invention. The present invention should be limited only by the appended claims.

We claim:

1. A method for scanning channels of a wireless communication system comprising the steps of:
   scanning a first set of channels;
   saving information obtained during said step of scanning said first set of channels;
   determining a second set of channels;
   determining which channels of said second set of channels do not coincide with said first set of channels; and
   scanning predetermined channels of said second set of channels which do not coincide with said first set of channels.

2. The method for scanning channels of claim 1 wherein said step of scanning a first set of channels comprises scanning a set of dedicated control channels.

3. The method for scanning channels of claim 1 wherein said step of saving information obtained during said step of scanning said first set of channels comprises saving signal strength information.

4. The method for scanning channels of claim 1 wherein said step of determining a second set of channels comprises determining a set of paging channels.

5. The method for scanning channels of claim 1 wherein said step of scanning a second set of channels comprises scanning a set of paging channels.

6. The method for scanning channels of claim 1 further including a step of saving information obtained during said step of scanning predetermined channels of said second set of channels.

7. The method for scanning channels of claim 6 wherein said step of saving information comprises saving signal strength information.

8. A method for scanning channels of a wireless communication system comprising the steps of:
   scanning a set of dedicated control channels;
   saving information obtained during said step of scanning said set of dedicated control channels;
   determining a paging channel range;
   determining which paging channels of said paging channel range do not coincide with said dedicated control channels; and
   scanning predetermined paging channels of said paging channel range which do not coincide with said control channels.

9. The method for scanning channels of claim 8 wherein said step of saving information obtained during said step of scanning said set of dedicated control channels comprises saving signal strength information.

10. The method for scanning channels of claim 8 further including a step of saving information obtained during said step of scanning said predetermined paging channels.

11. The method for scanning channels of claim 10 wherein said step of saving information obtained during said step of scanning said predetermined paging channels comprises saving signal strength information.

12. A method for scanning channels of a wireless communication system comprising the steps of:
   scanning each dedicated control channel of said wireless communication system;
   saving the signal strength for each dedicated control channel;
   sorting the dedicated control channels in order from strongest signal strength to weakest signal strength;
   attempting to acquire a word sync on the strongest channel of said dedicated control channels;
   attempting to receive an overhead message for a first channel of said dedicated control channels on which a word sync was acquired;
   determining a set of paging channels after an overhead message is received; and
   determining if the set of paging channels is a subset of said dedicated control channels.

13. The method for scanning channels of claim 12 further including a step of determining whether the first channel is within the set of paging channels when an overhead message is found in the first channel.

14. The method for scanning channels of claim 13 further including a step of establishing a paging channel when said first channel is within the set of paging channels.

15. The method for scanning channels of claim 12 further including a step of scanning and saving the signal strength of each paging channel which is not a dedicated control channel.

16. The method for scanning channels of claim 12 further including a step of constructing a list of paging channels.

17. The method for scanning channels of claim 16 sorting the paging channels in order from strongest signal strength to weakest signal strength.

18. The method for scanning channels of claim 17 attempting to acquire a word sync on the strongest channel of said paging channels.

19. The method for scanning channels of claim 18 attempting to receive an overhead message for a first channel of said paging channels on which a word sync was acquired.

20. The method for scanning channels of claim 19 further including a step of determining whether a first system identification (SID) received in the paging channel is the same as a second system identification (SID) received during said step of scanning and saving.

* * * * *